Patented Mar. 2, 1937

2,072,261

UNITED STATES PATENT OFFICE 2,072,261

ESTERIFICATION OF CELLULOSE

Clifford I. Haney, Drummondville, Quebec, Canada, assignor to Celanese Corporation of America, a corporation of Delaware No Drawing. Application September 29, 1934, Serial No. 746,263

8 Claims. (Cl. 260—101)

This invention relates to organic esters of cellulose and to the method of preparing same and more particularly to the acetylation of cellulose to a cellulose acetate wherein the esterification is rapid and the viscosity of the resulting ester is controlled by the temperature of the reaction and such a method that produces an ester that requires no stabilization.

An object of the invention is the economic and expeditious production of cellulose esters that require no stabilization after ripening and precipitation but that are chemically stabilized by their method of formation. Another object of the invention is the method of producing cellulose esters by a more rapid than normal esterification. Other objects of the invention will appear from the following detailed description.

In the process of preparing organic esters of cellulose, the esterification of the cellulose is usually performed by treating the cellulose with an organic acid anhydride in the presence of an organic acid diluent or solvent for the ester of cellulose being formed and a catalyst such as sulphuric acid. After completion of the esterification of the cellulose, there results a homogeneous viscous solution and water may then be added in amounts sufficient to convert any organic acid anhydride remaining into the corresponding acid, whereupon, usually after the addition of a certain quantity of water, the cellulose ester is permitted to hydrolize or ripen to develop the desired solubility characteristics. Water and/or other non-solvent for the cellulose ester may then be added in sufficient amounts to precipitate the cellulose ester from solution. The cellulose ester is then washed and/or distilled to free it of acids as much as possible and then it is stabilized which may include boiling it in water and other like treatments.

Thus in preparing cellulose acetate, cellulose is acetylated by treatment with acetic anhydride and a catalyst, such as sulphuric acid, in the presence of glacial acetic acid as a solvent for the cellulose acetate that is formed. After completion of the acetylation, the resulting solution of cellulose acetate in glacial acetic acid is ripened and then treated with a large excess of water or other non-solvent to precipitate the cellulose acetate. After precipitation the cellulose acetate may be washed with water to remove as much acid and other non-cellulose acetate ingredients of the acetylation mixture as possible.

The removal of these ingredients is a serious problem and is termed stabilization as these products, some of which contain labile sulphur compounds have the property of degrading the cellulose acetate. By this invention however such compounds are either not formed or they are reduced to stable compounds or compounds that are easily rinsed from the precipitated material. By employing this invention cellulose esters are formed that may be processed to products such as filaments directly from their ripening solution without the necessity of precipitating, stabilizing and re-dissolving them.

By this invention cellulose esters that are clear in solution, have a high heat test and are stable, are formed directly in the esterification step and further steps to increase these properties are not necessary.

By employing this invention the time of esterification may be greatly shortened while at the same time the viscosity of the resulting solution may be controlled, that is, the viscosity of the solution of the cellulose ester.

In accordance with my invention then I esterify cellulose or its near conversion products to from cellulose esters of the fatty acids, using smaller amounts of sulphur compounds than in former methods and with the aid of a hydrohalic acid such as hydrochloric acid, salts of hydrohalic acids such as hydrochloric acid or mixtures of the same such as hydrochloric acid and a salt of same under regulated temperatures.

This invention is applicable to the formation of stable, clear and otherwise desirable organic esters of cellulose such as cellulose acetate, cellulose formate, cellulose propionate and cellulose butyrate. Cellulose in any suitable form, such as cotton, cotton linters, wood pulp, either sulphite or soda pulp, reconstituted or regenerated cellulose, etc. may be employed as the parent cellulose from which the esters are formed. This cellulose may be activated by pretreatment with lower aliphatic acids or by treatment with alkali, etc. The esterifying agent may be acetic anhydride, formic acid, propionic anhydride, butyric anhydride, etc. depending upon the ester of cellulose to be formed.

In using sulphuric acid and/or compounds of sulphur as catalyst in the acetylation and partial hydrolysis of cellulose in the proportions of say 10 to 20% or more of the weight of the cellulose, there is produced a desired end product in a reasonable time at temperatures below 30 to 35° C. There is a disadvantage to such a process however in that the sulphuric acid and/or sulphur compounds which have combined with the cellulose or formed labile sulphur compounds are difficult and expensive to remove from the ester and products of uncertain stability and color result if these compounds are not removed.

By this invention, cellulose esters that are clear in solution and stable are produced that require no stabilization and which have less than .08% sulphur compounds figured as SO₃ and a heat test of above 240° C. This improved ester of cellulose may be produced by employing less than 10% sulphuric acid or sulphur compounds figured as sulphuric acid and by the addition to the reaction of a hydrohalide acid or salt with, prior to, or after the addition of the sulphur containing catalyst as an aid thereto and as an inhibitor or remover of sulpho-cellulose compounds that are unstable or act to unstabilize the cellulose ester product.

The catalytic aid employed may be hydrochloric acid, perchloric acid or other hydrohalic acid and/or their salts and mixtures of same. Examples of salts that are particularly applicable are sodium chloride, zinc chloride, aluminum chloride and the like. These aids may be used in from 2 to 15% of the weight of the cellulose. The temperature employed for esterification will control to a certain extent the viscosity of the resulting product. It may be generally said, however, that in reducing the sulphur type catalyst and employing the halide catalyst-aid, temperatures of from 2 to 8° C. or higher may be employed to produce esters of the same viscosity as those produced with sulphur-type catalysts alone.

The cellulose ester produced by the method of this invention may be ripened or hydrolized in the normal manner by the addition of a suitable quantity of water to the primary solution resulting from the esterifying process and permitting the same to stand at suitable temperature for such time until the cellulose ester develops the desired solubility characteristics, prior to distillation or precipitation and draining to recover a part or all of the organic acid employed as a solvent or diluent in the esterification process. A rinse of the precipitated cellulose ester to remove adhering acid is all that is necessary.

As illustrations and not as limitations the following examples are given.

*Example I*

A charge of cotton linters is pretreated with the following materials calculated on the weight of the linters.

| | Percent |
|---|---|
| Acetic acid anhydride | 10 |
| Glacial acetic acid | 30 |
| sulphuric acid | 0.8 |
| Zinc chloride | 2 |

To this mixture, cooled such that the peak temperature resulting in the esterification step is between 35° and 37° C., there is added an esterifying mixture containing

| | Percent |
|---|---|
| Sulphuric acid | 6 |
| Acetic anhydride | 250 |
| Acetic acid | 350 |

During the reaction about 2% of hydrochloric acid is added. Hydrochloric acid of 32% concentration is preferably employed, in an amount to give 2% HCl on the cellulose. The acetylation is allowed to run from the addition of the esterifying mixture for between 115 and 125 minutes then water of addition is added to convert any anhydride remaining to the acid. Then the same may be ripened for three days at about 25° C. when it may be precipitated and rinsed with water. The product is an acetone soluble cellulose acetate that is perfectly clear in solution, of high viscosity, heat test and stability.

*Example II*

7.5 parts by weight of cellulose is pretreated with a mixture containing 1.8 parts of acetic anhydride
1.2 parts of acetic acid
0.045 part of sulphuric acid To pretreated cellulose is then charged to an acetylizer containing

| | Parts |
|---|---|
| Acetic anhydride | 20 |
| Acetic acid | 28 |
| Sulphuric acid | 0.5 |
| Zinc chloride | 0.3 |

The mixtures are suitably cooled such that a peak temperature of about 43° C. is reached and the period of acetylation is about 2 hours. Water may be added to convert any remaining anhydride to its acid. The water for hydrolysis is added along with 0.5 part of hydrochloric acid and the product ripened 3 days at 25° C. Substantially the same results are obtained as in Example I.

In place of employing both zinc chloride and hydrochloric acid there may be employed only hydrochloric acid or a halide salt in amounts sufficient to theoretically yield about the same amount of hydrochloride as described in the above example. Thus the method described above may be performed by employing theoretically equivalent amounts of aluminum chloride or other halide salt or salts.

By raising the temperature of reaction to above 45° C. a shorter esterification period is obtained with the resulting product of a viscosity below that normally employed in the manufacture of textile filaments and near that employed in lacquers. By increasing the amount of halide catalyst-aid and decreasing the amount of catalyst of sulphuric acid or its compounds a still higher temperature may be employed.

If the hydrochloric acid is not added during the esterification as in Example II it is preferable to add same just before or with the water of hydrolysis or as it is termed water of addition, otherwise the temperature during ripening must either be allowed to raise to 35° to 40° C. or the ripening period extended for a longer time.

It is to be understood that the foregoing detailed description is merely given by way of illustration and many alterations may be made therein without departing from the spirit of my invention.

Having described my invention what I desire to secure by Letters Patent is:

1. A method of producing a stable cellulose ester of an organic acid, which comprises esterifying cellulose in the presence of less than 10% of a sulphur-containing catalyst, together with 2% to 15% of a halogen-containing inorganic acid, the catalyst and the halogen-containing inorganic acid being present throughout the esterification, said ester requiring no stabilization step.

2. A method of producing stable cellulose acetate, which comprises acetylating cellulose in the presence of less than 10% of a sulphur-containing catalyst, together with 2% to 15% of a halogen-containing inorganic acid, the catalyst and the halogen-containing inorganic acid being present throughout the acetylation, said cellulose acetate requiring no stabilization step.

3. A method of producing stable cellulose acetate, which comprises acetylating cellulose in the presence of less than 10% of a sulphur-containing catalyst, together with 2% to 15% of hydrochloric acid, the catalyst and the hydrochloric acid being present throughout the acetylation, said cellulose acetate requiring no stabilization step.

4. A method of producing stable cellulose acetate, which comprises acetylating cellulose in the presence of less than 10% of sulphuric acid, together with from 2 to 15% of hydrochloric acid, the sulphuric acid and the hydrochloric acid being present throughout the acetylation, said cellulose acetate requiring no stabilization step.

5. A method of producing a stable cellulose ester of an organic acid, which comprises esterifying cellulose in the presence of less than 10% of a sulphur-containing catalyst, together with 2% to 10% of a halogen-containing inorganic acid and with a metal halide, the catalyst and the halogen-containing inorganic acid and the metal halide being present throughout the esterification, said ester requiring no stabilization.

6. A method of producing stable organic esters of cellulose, which comprises esterifying cellulose in the presence of less than 10% of a sulphur-containing catalyst, together with 2% to 15% of hydrochloric acid and with a metal halide, the catalyst and the hydrochloric acid and the metal halide being present throughout the acetylation, said cellulose acetate requiring no stabilization.

7. A method of producing stable cellulose acetate, which comprises acetylating cellulose in the presence of less than 10% of sulphuric acid, together with from 2 to 15% of hydrochloric acid and with a metal halide, the sulphuric acid, the hydrochloric acid and the metal halide being present throughout the acetylation, said cellulose acetate requiring no stabilization.

8. A method of producing stable cellulose acetate, which comprises acetylating cellulose at a temperature between 0° C. and a peak temperature of 40° C. in the presence of less than 10% of sulphuric acid, together with from 2 to 15% of hydrochloric acid and with a metal halide.

CLIFFORD I. HANEY.